Nov. 8, 1960 H. H. TURNER 2,958,939
METHOD OF PREPARING AND MOUNTING MEASURING STRIPS
Filed Sept. 6, 1957 2 Sheets-Sheet 1
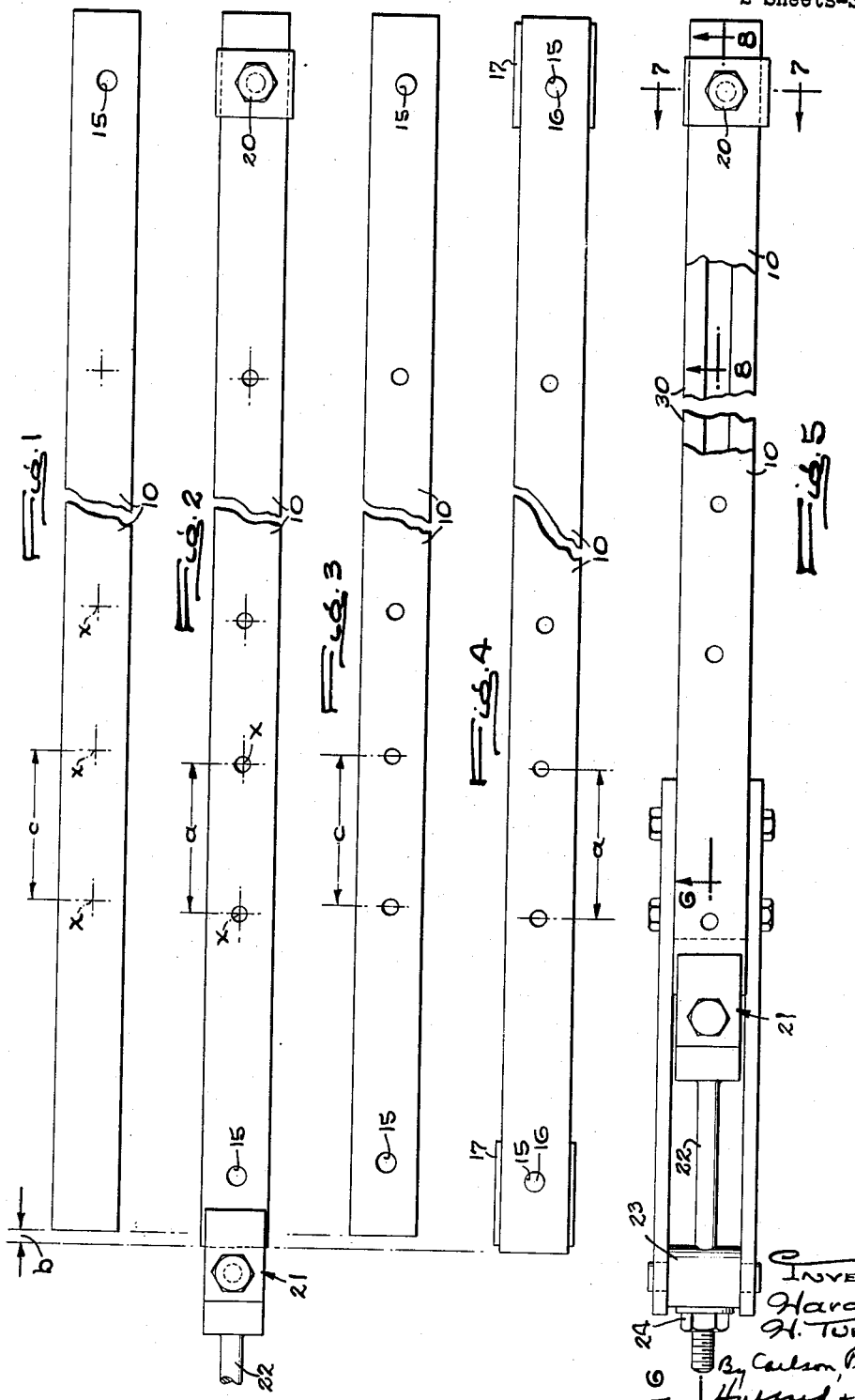

Nov. 8, 1960 H. H. TURNER 2,958,939
METHOD OF PREPARING AND MOUNTING MEASURING STRIPS
Filed Sept. 6, 1957 2 Sheets-Sheet 2
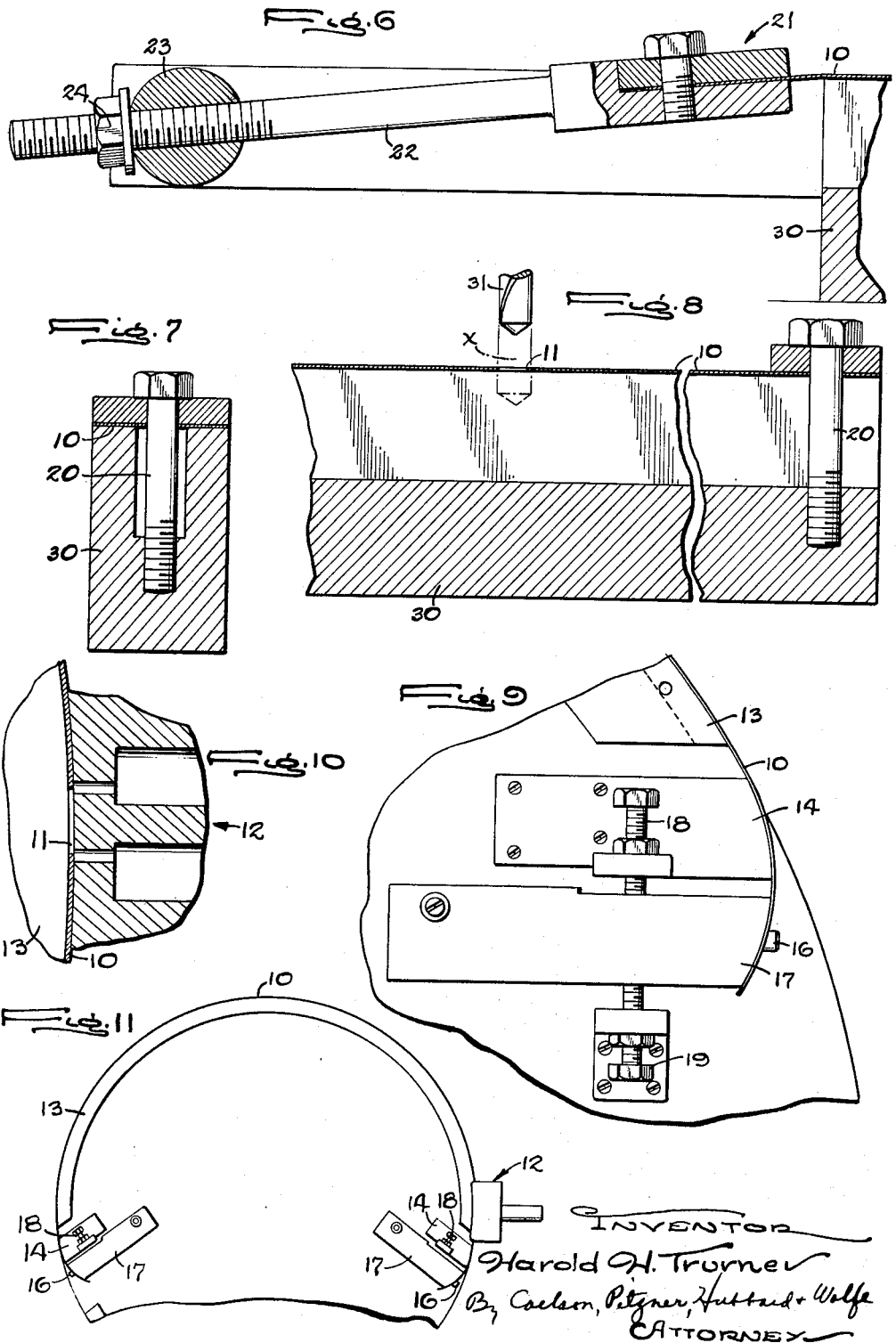

United States Patent Office 2,958,939
Patented Nov. 8, 1960

2,958,939
METHOD OF PREPARING AND MOUNTING MEASURING STRIPS

Harold H. Turner, Rockford, Ill., assignor to The Ingersoll Milling Machine Company, Rockford, Ill., a corporation of Illinois Filed Sept. 6, 1957, Ser. No. 682,529

4 Claims. (Cl. 29—407)

This invention relates to the preparation and mounting of elastic strips for use in measuring systems such, for example, as that disclosed in my pending application, Serial No. 654,924, filed April 24, 1957.

The general object is to form reference indicia along an elastic measuring strip in a novel manner such that the spacing remains unaffected by relatively wide temperature changes to which the strip may be subjected in service use.

A more detailed object is to form the reference indicia on the strip while the latter is held under longitudinal tension sufficient to stretch the strip an amount correlated with the maximum thermal expansion of the strip which is likely to occur in service.

A further object is to mount the prepared strip for service use by stretching the strip over a support and holding the same under substantially the same tension as that employed during formation of the reference indicia thereon.

Other objects and advantages of the invention will become apparent from the following detailed description taken in connection with the accompanying drawings, in which Figures 1 to 4 are fragmentary views illustrating the steps of preparing and mounting a measuring strip in accordance with the present method.

Fig. 5 is a fragmentary plan view of the strip and the mechanism for stretching the same.

Figs. 6 and 7 are fragmentary sections taken along the lines 6—6 and 7—7 of Fig. 5.

Fig. 8 is a fragmentary sectional view taken along the line 8—8 of Fig. 5 showing the other end of the strip.

Fig. 9 is a fragmentary side view of a device for stretching the strip in its final mounting.

Fig. 10 is a fragmentary sectional view of one form of device for sensing the reference indicia on the strip.

Fig. 11 is an elevational view of a typical measuring device incorporating the strip prepared in accordance with the improved method.

While the invention is adapted for use with various types of measuring strips such as rigid or flexible bars or tapes composed of different kinds of elastic materials subject to thermal expansion, it is illustrated in the drawings in connection with the preparation and mounting of a metal tape 10 having indicia in the form of holes 11 spaced along its length predetermined distances $a$ and adapted, in the measuring operation, to cooperate with a vernier scale or other sensing device 12. The latter may, for example, comprise a pneumatic bridge network such as that partially shown in Fig. 10 and fully disclosed in the aforesaid applicaiton. Herein, the tape is mounted for endwise movement past the sensing device 12 and, for this purpose, it is stretched around a peripheral portion of a rotary drum 13 suitably grooved to receive the tape.

To fasten the tape to the drum, end portions thereof beyond the ends of the drum groove are bent around the arcuate outer ends of blocks 14 fixed on the drum in the plane of the tape. Beyond the fixed blocks holes 15 near opposite ends of the tape are fitted over pins 16 on blocks 17, which, by manipulating screws 18, are adjustable toward and away from each other to stretch the tape around the drum and maintain a desired tension in the tape. The finally adjusted position of each block 17 is held by an adjustable stop screw 19.

In accordance with the present invention, the holes 11 are formed in proper spaced relation while the tape is stretched by an amount correlated with the temperature changes likely to occur in the tape during service use. Then, in mounting the tape on the drum 13 or other support for service use, this same amount of stretching is restored and maintained. As a result, the spacing of the holes 11 remains the same in spite of changes in ambient temperature, the only effect of such changes being to vary the maintained tension in the tape.

The method of preparing the tape is illustrated in Figs. 1 to 3. A strip of hardened steel, preferably about .01 of an inch thick and of a length determined by the desired range of the measuring device, is mounted in a suitable fixture 30 and the holes 15 above described are formed near opposite ends. A stud 20 is projected through one hole to clamp one end of the tape to the fixture. The other end is fastened securely as by a screw clamp 21 to a rod 22 threaded at its outer end which extends through a hole in a cross bar 23 on the fixture.

By tightening a nut 24, the rod 22 may be pulled endwise and the tape tensioned longitudinally to a unit stress which is well within the elastic limit of the steel but sufficient to stretch the tape and elongate the same by a calculated amount $b$ (see Fig. 2). The calculation is based on the thermal characteristics of the tape material and the temperature range, for example, 150 deg. F., over which the tape temperature may vary in service use. The distance $b$ equals the change in the length of the tape which would result from varying the tape temperature over the selected range when the tape is free to expand and contract.

While the tape is held in this stretched condition, the holes 11 are formed at the points $x$ by a drilling tool 31 or by any other suitable method such as punching, grinding, or electric erosion. The points $x$ are spaced apart distances $a$ corresponding precisely to the lengths of the reference increments, for example inches, ultimately used in making measurements with the completed measuring device. When the tension is released and the prepared tape removed from the fixture, its length will be reduced by the amount $b$, the spacing of the hole centers being shortened correspondingly as indicated at $c$ (see Fig. 3).

To mount the tape for use in the measuring device, it is wrapped around the groove in the drum 13 and interlocked with the pins 16 on the blocks 17 in the manner above described. Then, by adjustment of the screws 18, the tape is stretched to the same degree as during the formation of the holes (see Fig. 4). Also, the tape is shifted endwise along the drum groove so as to center each of the holes 11 relative to the sensing device 12 (see Fig. 10) when the drum, by accurate positioning through the use of conventional measuring instruments, is disposed in spaced positions corresponding to the respective holes. Such stretching of the tape thus results in increasing the hole spacing from the distance $c$ to the distance $a$. Thereafter, the sensing device will coact with the respective holes as fully described in the aforesaid application to indicate the accurate disposal of the drum in positions represented by the respective holes.

With the tape thus mounted in the measuring device, changes in the tape temperature which accompany variations in ambient air temperatures will not affect the spacing of the holes 11. That is to say, such temperature changes will merely vary the unit tensile stress within the stretched tape, the positions of the holes 11 relative to the supporting drum and the spaces *a* remaining fixed. By compensating for ambient temperature changes in this manner, it is possible to employ tape composed of ordinary materials and still produce a measuring device operable with great precision over long ranges and under the widely varying temperatures normally occurring in an ordinary machine shop.

I claim as my invention:

1. The method of preparing an elongated strip of elastic material for service use in measuring distances over a given ambient temperature range by reference to indicia spaced predetermined precise distances apart along the strip stretched along a support, said method including the steps of gripping a blank length of said strip at longitudinally spaced points, separating said gripped points to tension and stretch the intervening length of the strip and to elongate the same within the elastic limit of said material an amount greater than the total thermal expansion and contraction which will take place over a temperature range at least as great as that to which the strip will be subjected in said service use, forming said indicia on the strip thus stretched with the indicia separated by spaces precisely equal to said predetermined distances, gripping the portion of said strip thus marked at longitudinally spaced points, and tensioning and stretching said marked length of the strip along said support to secure the strip to the support and elongate said spaces precisely to said predetermined distances whereby the length of said spaces remains substantially unaffected by subsequent temperature changes to which the strip is subjected in said service use.

2. The method of preparing an elongated strip of elastic material for use in measuring distances over a given ambient temperature range by reference to indicia spaced predetermined precise distances apart along the strip stretched along a support, said method including the steps of tensioning and stretching a blank strip to elongate the same within its elastic limit and by an amount corresponding to the thermal expansion and contraction which would result from a substantial change in the strip temperature, forming said indicia on the strip thus stretched with the indicia separated by spaces precisely equal to said predetermined distances, mounting said formed strip in operative position on said support, and again tensioning and stretching the same to elongate said spaces precisely to said predetermined distances.

3. The method of preparing an elongated metal strip for use in measuring distances over a given ambient temperature range by reference to indicia spaced predetermined precise distances apart along the strip, said method including the steps of tensioning and stretching a blank strip of said material to elongate the same within its elastic limit an amount greater than the total thermal expansion and contraction which will take place in the strip when subjected to ambient temperature changes occurring in service use, and forming said indicia on the strip while the latter is thus stretched with the indicia separated by spaces precisely equal to said predetermined distances.

4. The method of preparing an elongated strip of elastic material for service use in measuring distances over a given ambient temperature range by reference to indicia spaced predetermined precise distances apart along the strip stretched along a support, said method including the steps of gripping said strip at longitudinally spaced points, separating said gripped points to tension and stretch the intervening length of the strip to elongate the same within the elastic limit of said material an amount greater than the total thermal expansion and contraction which will take place over a temperature range at least as great as that to which the strip will be subjected in said service use, forming said indicia on the strip while thus stretched with the indicia separated by spaces precisely equal to said predetermined distances, gripping the portion of said strip thus marked at longitudinally spaced points, and tensioning and stretching said marked length of the strip along said support to secure the strip to the support and elongate said spaces precisely to said predetermined distances whereby the length of said spaces remains substantially unaffected by subsequent temperature changes to which the strip is subjected in said service use.

References Cited in the file of this patent

UNITED STATES PATENTS

| 2,342,025 | Watter | Feb. 15, 1944 |
| 2,441,858 | Watter | May 18, 1948 |
| 2,711,575 | Zesbaugh | June 28, 1955 |